(12) United States Patent
Ma et al.

(10) Patent No.: US 7,533,910 B2
(45) Date of Patent: May 19, 2009

(54) CLAMP

(75) Inventors: Rufei Ma, Buffalo Grove, IL (US); Dan Liedtke, Oswego, IL (US)

(73) Assignee: R.G. Ray Corp., Buffalo Grove, IL (US)

( * ) Notice: Subject to any disclaimer, the term of this patent is extended or adjusted under 35 U.S.C. 154(b) by 37 days.

(21) Appl. No.: 11/345,871

(22) Filed: Feb. 1, 2006

(65) Prior Publication Data
US 2007/0176425 A1    Aug. 2, 2007

(51) Int. Cl.
*F16L 25/00* (2006.01)
(52) U.S. Cl. .................. 285/420; 285/364; 285/406; 285/407; 285/412
(58) Field of Classification Search ......... 285/364–368, 285/406–407, 410–411, 420; 403/289–290, 403/344
See application file for complete search history.

(56) References Cited

U.S. PATENT DOCUMENTS

| | | | |
|---|---|---|---|
| 591,796 A | 10/1897 | De Wolf | |
| 2,377,510 A | 6/1945 | Newell | |
| 2,893,097 A | 7/1959 | Hill et al. | |
| 3,235,293 A | 2/1966 | Condon | |
| 3,601,868 A | 8/1971 | Elsner et al. | |
| 3,861,723 A | 1/1975 | Kunz et al. | |
| 4,281,863 A | 8/1981 | Hall | |
| 4,722,561 A | 2/1988 | Heckethorn et al. | |
| 5,720,086 A | 2/1998 | Eliasson et al. | |
| 5,782,499 A | 7/1998 | Gfrerer et al. | |
| 5,815,892 A | 10/1998 | Geppert | |
| 6,052,873 A | 4/2000 | Cuno | |
| 7,290,805 B2 * | 11/2007 | Wu | .............................. 285/365 |
| 2004/0017083 A1 * | 1/2004 | Balamuta et al. | ............ 285/390 |

* cited by examiner

*Primary Examiner*—Aaron M Dunwoody
*Assistant Examiner*—Fannie Kee
(74) *Attorney, Agent, or Firm*—Husch Blackwell Sanders LLP Welsh & Katz

(57) ABSTRACT

A clamp that includes a collar having first and second ends from which first and second lugs extend. Each of the first and second lugs has a thick portion and a thin portion, and the lugs are connected by a fastener. The clamp is positioned around tubes, and the fastener is tightened to tighten the clamp around the connection. The fastener may be tightened from an open position OP, when the lugs are not touching, to a closed position CP, when the thick portions of the lugs are touching. The fastener may be tightened further to a third position, so that the thin portions of the lugs move closer to one another. The clamp may also include a hinge area in which a gasket seal may be attached to the clamp or one of the tubes.

17 Claims, 4 Drawing Sheets

SECTION A—A

SECTION A—A

SECTION A—A

CLAMP

BACKGROUND OF THE INVENTION

The present invention relates to clamps used to connect tubes and, in particular, flared or flanged tubes.

Clamps are often used to connect tubes. For example, most vehicles incorporate several tubes in their exhaust system that are connected by clamps. Tubes from the engine block, the catalytic converter and the tail pipe are connected to one another by clamps. The clamps and tubes are exposed to a wide range of temperature variations and stresses. The temperature varies from ambient, at vehicle start-up, to near exhaust gas temperature when operating under heavy loads. Stresses arise from engine vibrations, exhaust gas pressure, exhaust system weight, road bumps, etc.

The temperature variations often cause expansion and contraction of both the tubes and the clamps. The clamps must securely connect the tubes to prevent leakage while withstanding the temperature variations and stresses. As shown in FIG. 1, clamps 10 of the prior art consist of a collar 12 that have two lugs 14 of uniform thickness extending from ends of the collar. Apertures are formed within the lugs, and a fastener 16 is inserted through the apertures to connect the lugs 14. The collar 12 is positioned around and tightened onto the tubes to be connected. Specifically, the fastener is tightened sufficiently to seal the connection.

When tightening the clamp 10 of the prior art, both lugs 14 may bend towards one another. The clamps can only be effectively tightened to a point where the portion of the lugs 14 near the bolt touch and press against one another. In this case, some portion of the installation energy was wasted in deforming the lugs, instead of pulling both ends of the collar 12 together. Thus, the clamp often times does not generate enough force to seal the connection. Tubes to be connected, nonetheless, often require a tighter fit to prevent unwanted leakage. At installation, the collar 12 of the clamp 10 of the prior art must be opened to slide the clamp over tubes, including those that are flared or flanged. The collar 12 is often times too rigid to be sufficiently opened.

Accordingly, there exists a need for a clamp that addresses the shortcomings of the prior art.

BRIEF SUMMARY OF THE INVENTION

The present invention pertains to a clamp that can be used with tubes, including flared or flanged tubes. For example, the present invention may be used to connect tubes of a vehicle exhaust system. A first embodiment of the clamp includes a collar that has first and second ends. The collar can have a variety of cross-sections, such as a "V" shape, a semi-circular shape, or a "V" shape with a flat bottom. First and second lugs extend from the first and second ends of the collar and are connected by a fastener. Each lug has a thick portion and a thin portion.

The clamp is positioned around the tubes to be connected, and the fastener is tightened to tighten the clamp around the connection. The fastener may be tightened from an open position, when the lugs are not touching, to a closed position, when the thick portions of the lugs are touching. The fastener may be tightened further to a third position—even after the thick portions of the lugs touch—so that the thin portions of the lugs move closer to one another. The ability to further tighten the clamp after the thick portions of the legs touch allows the first embodiment of the clamp to attain a tight fit with the tubes.

In a second embodiment of the clamp, the collar includes one or more hinge areas formed in the collar. For improved sealing, the hinge area allows space to position a gasket between the clamp and the tubes, including flared or flanged tubes. The hinge area also allows the clamp to be easily opened enough to slide over the tube flare or flanges during installation.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
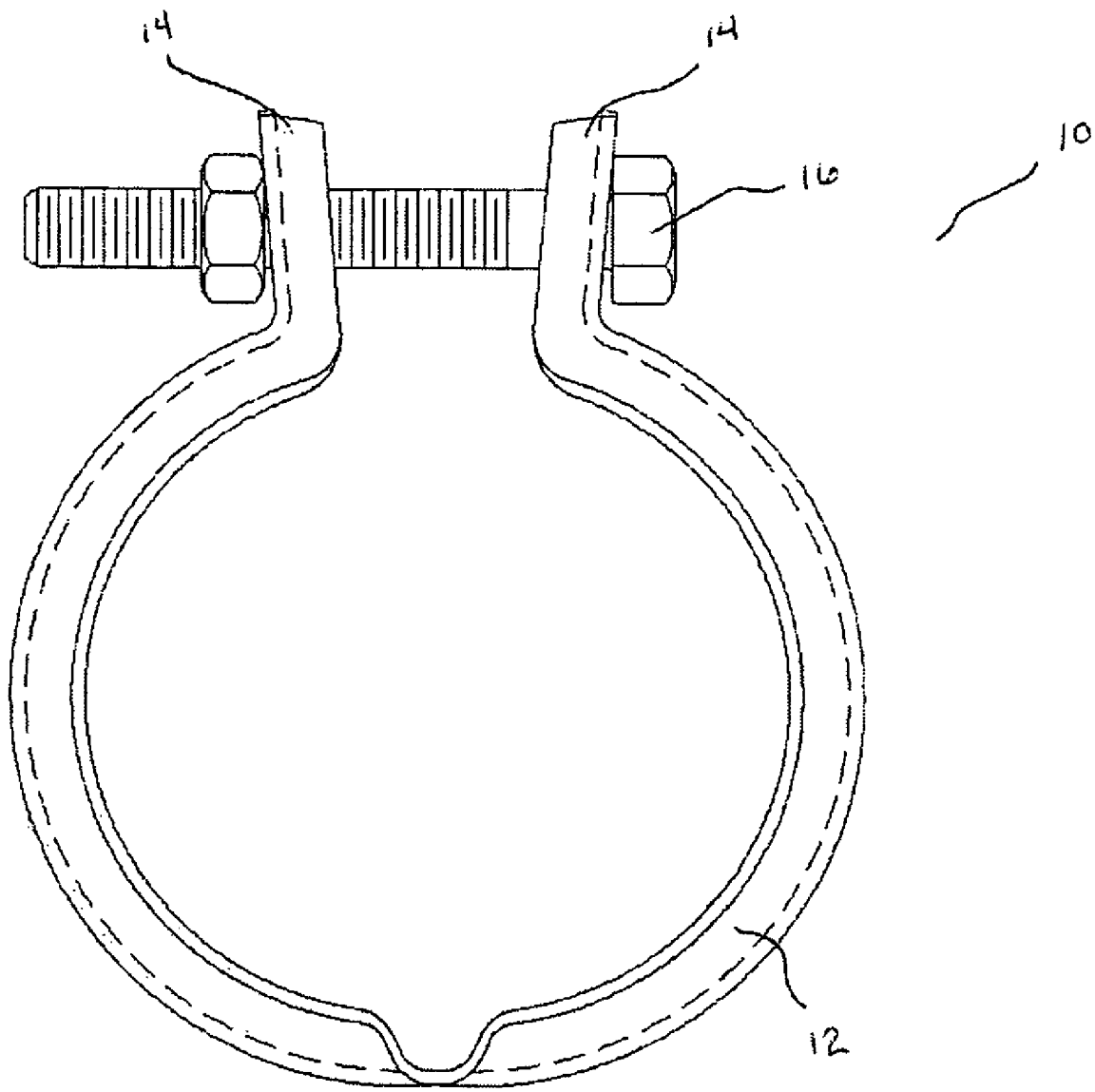
FIG. 1 is a front view of a prior art clamp.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Figure 2:
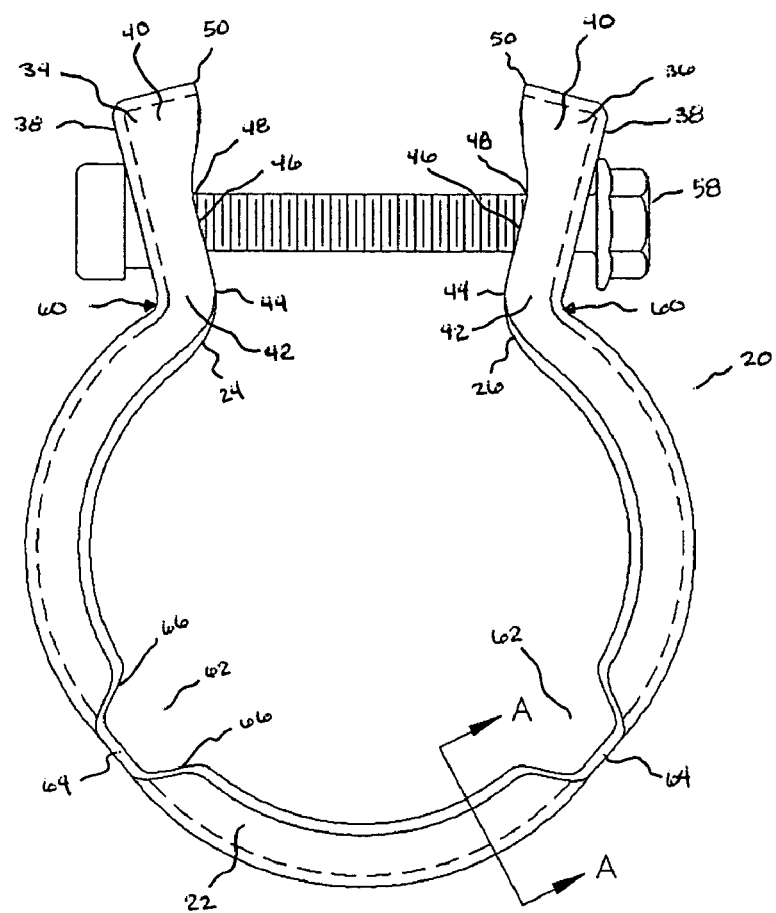
FIG. 2 is a front view of a clamp having features of both first and second embodiments of the invention.
Figure 2A:
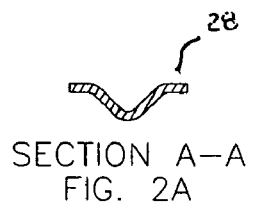
FIG. 2a is a close up view of a cross-section of the clamp shown in FIG. 2 along line A-A.
Figure 2B:
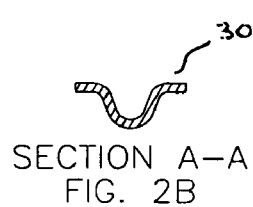
FIG. 2b is a close up view of a cross-section that a clamp of the invention may have.
Figure 2C:
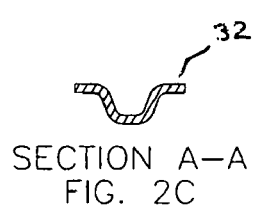
FIG. 2c is a close up view of a cross-section that a clamp of the invention may have.
Figure 3:
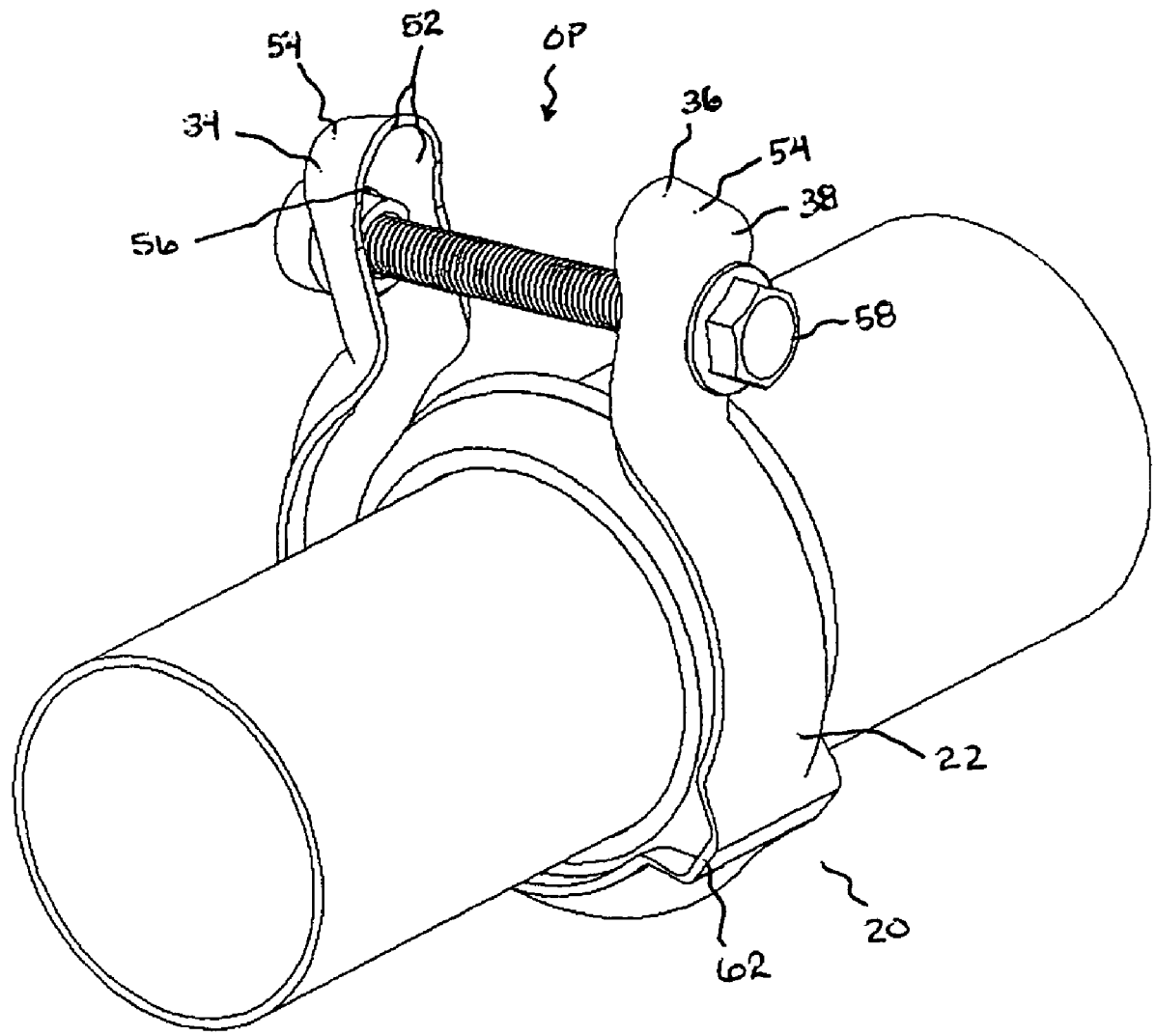
FIG. 3 is a perspective view of a clamp having features of both first and second embodiments of the invention in the open condition.
Figure 4:
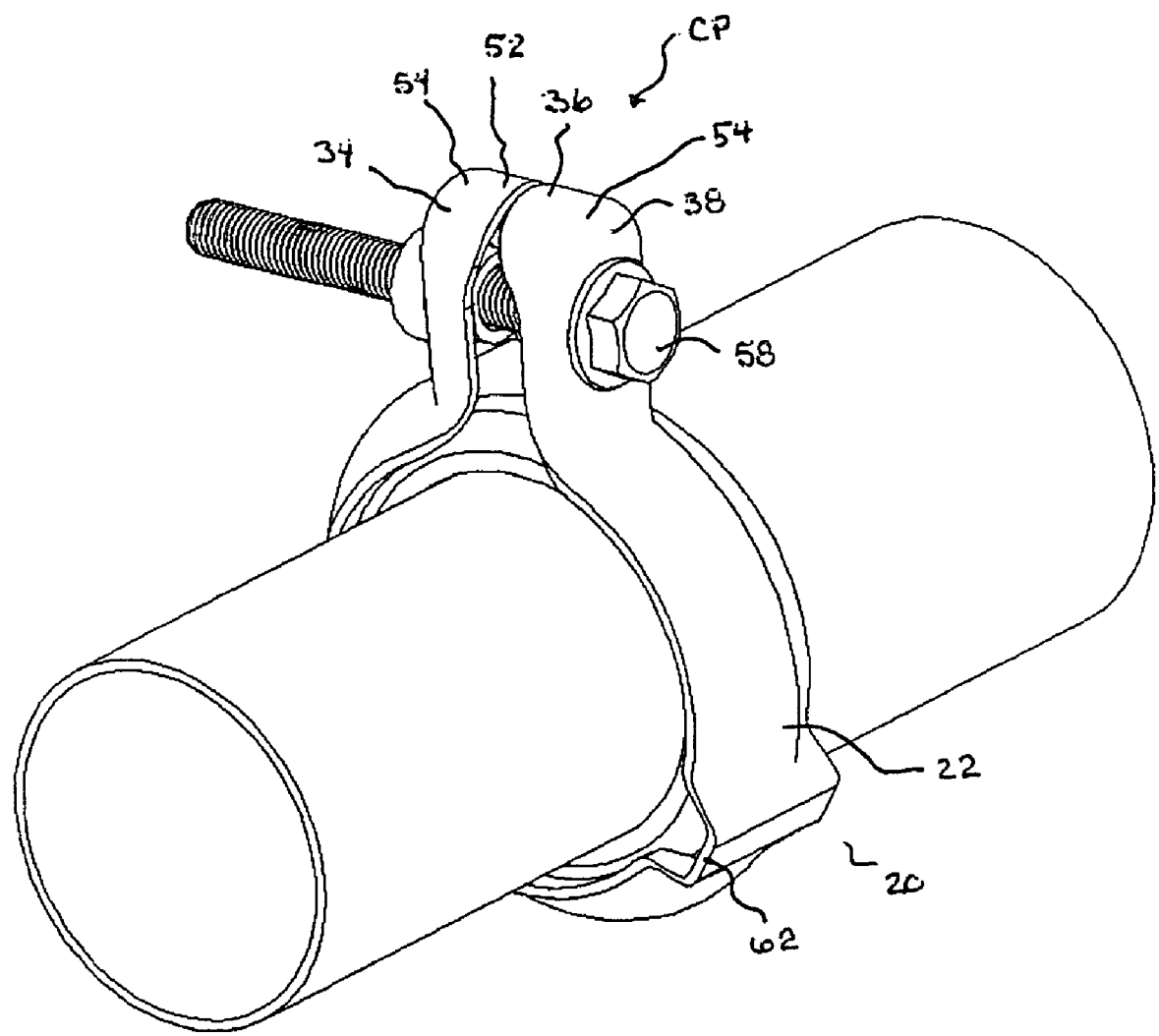
FIG. 4 is a perspective view of a clamp having features of both first and second embodiments of the invention in the tightened position.

The present invention pertains to a clamp that can be used with tubes, including flared or flanged tubes. For example, embodiments of the invention may be used to connect tubes of a vehicle exhaust system. FIGS. 3 and 4 show perspective views of a clamp 20 having features from both first and second embodiments of the invention. The first embodiment includes a collar 22 that has first and second ends 24, 26. FIG. 2 shows a cross-sectional line A-A, and FIG. 2(a) depicts a "V" shaped cross-section 28 of the collar 22 when cut along line A-A. In other embodiments, the cross-section may be defined by other shapes, such as the semi-circular shaped cross-section 30 shown in FIG. 2(b) or the "V" shaped cross-section with a flat bottom 32 shown in FIG. 2(c).

First and second lugs 34, 36 extend from the first and second ends 24, 26 of the collar 22, and the lugs 34, 36 may form a variety of angles with the periphery of the collar depending on the application in which the collar is to be used. Each lug has an outside face 38 and thick 40 and thin 42 portions. The thin portions 42 have a lower point 44 and extend upward to an upper point 46 in a straight line as shown in FIG. 2. In other embodiments, the thin potion may extend upward from the lower to the upper point while gradually tapering inward, away from the outside face, or outward, toward the outside face.

The thick portion 40 may abruptly extend inward, away from the outside face 38, at a lower point 48 of the thick portion; or, as shown in the embodiment of FIG. 2, the thick portion 40 gradually tapers inward, away from the outside face 38, starting at the lower point 48 of the thick portion until the thick portion reaches a greater thickness at an upper point 50 of the thick portion. The lugs 34, 36 may be defined by a variety of cross-sections and, in the embodiment shown in FIG. 3, have lug walls 52 that extend inwardly from the outer face 38 and that define the periphery 54 of the lugs 34, 36 and lug apertures 56 (described below).

The lugs 34, 36 are connected to one another by a fastener 58. In the embodiment of FIG. 2, the lugs 34, 36 each include the lug aperture 56 formed therein. One of the apertures 56 may be inserted with a nut, which is loosely or securely attached to the lug. The fastener 58 is a nut and bolt fastener. The bolt is inserted through the aperture, which has no nut, and screwed into the nut which is attached to the other lug in one embodiment. In another embodiment, the bolt is inserted through both of the apertures and the nut is screwed onto the free end of the bolt. Those of skill in the art will appreciate that the spirit and scope of the invention encompasses a variety of fasteners that may be used to connect the first and second lugs.

The clamp 20 is positioned around the tubes to be connected, and the fastener 58 is tightened to tighten the clamp around the connection. The fastener 58 may be tightened from an open position OP (FIG. 3), when the lugs 34, 36 are not touching, to a closed position CP (FIG. 4), when the thick portions 40 of the lugs are touching. The fastener 58 may be tightened further to a third position—even after the thick portions 40 of the lugs touch—so that the thin portions 42 of the lugs 34, 36 move closer to one another (as shown by arrows 60 in FIG.2). The ability to further tighten the clamp 20 after the thick portions 40 of the lugs 34, 36 touch allows the first embodiment of the clamp to attain a tight fit with the tubes.

The terms "collar" and "tube" are used through this disclosure and shall mean "tubes" and "collars" of all shapes including but not limited to circular, polygonal and other shaped "tubes" and "collars." Those of skill in the art will recognize that the material of the clamp may vary depending on the application with which the clamp may be used and shall include but is not limited to clamps comprised from metal.

FIGS. 2, 3 and 4 also show features of a second embodiment of the clamp 20 in which the collar 22 includes one or more hinge areas 62 formed in the collar. The hinge areas 62 define a space between the clamp 20 and the tube that can be used to attach a gasket to the clamp or tube, allowing for improved sealing between tubes, including those that are flared or flanged. The hinge areas 62 also provide flexibility to allow the clamp 20 to be opened sufficiently to easily fit over the maximum diameter of the tubes being connected without disengaging the nut and bolt.

The hinge areas 62 may have a variety of shapes and, as shown in the embodiment of FIGS. 2, 3 and 4, the hinge areas are defined by hinge walls that form two angled planes 66 connected by a flat plane 64. Note that although FIGS. 2, 3 and 4 show clamps having hinge areas 62, the first embodiment need not include hinge areas or gaskets. The clamp has been shown and discussed as used with one or more tubes, including non-flared or non-flanged and flanged or flared tubes of an automobile exhaust system. Those of skill in the art, however, will appreciate that the clamp of the invention may be used and positioned around other tubes and other flanged or flared objects.

From the foregoing it will be observed that numerous modifications and variations can be made to the invention without departing from the true spirit and scope of the novel concepts of the present invention. It is to be understood that no limitation with respect to the specific embodiments illustrated is intended or to be inferred. The disclosure is intended to cover all such modifications as fall within the scope of the invention.

What is claimed is:

1. A clamp for use with tubes, comprising:
   a collar having first and second ends and at least one hinge area integrally formed therein, the at least one hinge area defining a space between the collar and an associated tube;
   a first lug coupled to the first end, the first lug including a distal end having a first thick portion and a proximal end having a first thin portion, wherein the first thick portion is thicker than the first thin portion, the first lug having an outside face extending radially from the collar and an inside edge opposite the outside face of the first lug, the inside edge of the first lug being substantially parallel to the outside face of the first lug along most of the length of the first thin portion;
   a second lug coupled to the second end, the second lug including a distal end having a second thick portion and a proximal end having a second thin portion, wherein the second thick portion is thicker than the second thin portion, the second lug having an outside face extending radially from the collar and an inside edge opposite the outside face of the second lug, the inside edge of the second lug being substantially parallel to the outside face of the second lug along most of the length of the second thin portion; and,
   a fastener connecting the first lug to the second lug, wherein the first and second lugs are spaced from one another when the fastener is in an open position, the first and second thick portions touching one another when the fastener is in a closed position.

2. The clamp of claim 1, wherein the first and second thin portions extend from thin portion lower points to thin portion upper points, the first thin portion upper point being closer to the first thick portion than the first thin portion lower point, and the second thin portion upper point being closer to the second thick portion than the second thin portion lower point.

3. The clamp of claim 1, wherein the first thick portion extends from a first thick portion lower point adjacent the proximal end of the first lug to a first thick portion upper point at the distal end of the first lug, the first thick portion upper point having a greater width than the first thick portion lower point, the second thick portion extending from a second thick portion lower point adjacent the proximal end of the second lug to a second thick portion upper point at the distal end of the second lug, the second thick portion upper point having a greater width than the second thick portion lower point.

4. The clamp of claim 3, wherein the inside edge of the first lug diverges from the outside face of the first lug while extending from the first thick portion lower point to the first thick portion upper point at the distal end of the first lug, and the inside edge of the second lug diverges from the outside face of the second lug while extending from the second thick portion lower point to the second thick portion upper point at the distal end of the second lug.

5. The clamp of claim 1, wherein the first and second lugs each further include a fastener aperture formed therein.

6. The clamp of claim 1, wherein the first and second lugs further include lug walls that define a lug periphery and a fastener aperture.

7. The clamp of claim 1, wherein the fastener further includes a nut and a bolt.

8. The clamp of claim 1, wherein, when viewed from a cross-sectional line, the collar is defined by a 'V' shaped cross-section.

9. The clamp of claim 1, wherein, when viewed from a cross-sectional line, the collar is defined by a semi-circular shaped cross-section.

10. The clamp of claim 1, wherein, when viewed from a cross-sectional line, the collar is defined by a 'V' shaped cross-section with a flat bottom.

11. The clamp of claim 1, wherein the at least one hinge area is defined by two angled planes connected by a flat plane.

12. The clamp of claim 1, wherein the at least one hinge area is suitable for housing a gasket to allow improved sealing between associated tubes.

13. A clamp to connect tubes, the clamp comprising:

a collar having first and second ends and at least one hinge area integrally formed therein, the at least one hinge area defining a space between the collar and an associated tube, the collar being defined by a 'V' shaped cross-section;

a first lug having a proximal and a distal end, an inside edge and a first outside face extending radially from the collar opposite the inside edge of the first lug, the proximal end of the first lug being coupled to the first end of the collar, the first lug having a first thin portion at the proximal end and a first thick portion at the distal end, the first thin portion extending from a lower first thin portion point adjacent the first end of the collar to an upper first thin portion point adjacent the first thick portion, the inside edge of the first lug being substantially parallel to the first outside face along most of the length of the first thin portion and the inside edge of the first lug diverging from the first outside face at the first thick portion, while extending from a lower first thick portion point adjacent the upper first thin portion to an upper first thick portion point at the distal end of the first lug, wherein the first thick portion is thicker than the first thin portion and the upper first thick portion point having a greater thickness than the lower first thick portion point;

a second lug having a proximal and a distal end, an inside edge and a second outside face extending radially from the collar opposite the inside edge of the second lug, the proximal end of the second lug being coupled to the second end of the collar, the second lug having a second thin portion at the proximal end and a second thick portion at the distal end, the second thin portion extending from a lower second thin portion point adjacent the second end of the collar to an upper second thin portion point adjacent the second thick portion, the inside edge of the second lug being substantially parallel to the second outside face along most of the length of the second thin portion and the inside edge of the second lug diverging from the second outside face at the second thick portion, while extending from a lower second thick portion point adjacent the upper second thin portion to an upper second thick portion point at the distal end of the second lug, wherein the second thick portion is thicker than the second thin portion and the upper second thick portion point having a greater thickness than the lower second thick portion point; and, a fastener connecting the first lug to the second lug, wherein the first and second lugs are spaced from one another when the fastener is in an open position, the first and second thick portions touching one another when the fastener is in a closed position.

14. The clamp of claim 13, wherein the first and second lugs include fastener apertures formed therein.

15. The clamp of claim 13, wherein the at least one hinge area is defined by two angled planes connected by a flat plane.

16. The clamp of claim 13, wherein the at least one hinge area is suitable for housing a gasket to allow improved sealing between associated tubes.

17. The clamp of claim 13, wherein the fastener further includes a nut and a bolt.

* * * * *